(12) United States Patent
Schwarz

(10) Patent No.: US 8,197,311 B2
(45) Date of Patent: Jun. 12, 2012

(54) DEVICE AND METHOD FOR SKINNING FISH FILLETS

(75) Inventor: Olaf Schwarz, Wismar (DE)

(73) Assignee: Nordischer Maschinenbau Rud. Baader GmbH + Co. KG, Luebeck (DE)

( * ) Notice: Subject to any disclaimer, the term of this patent is extended or adjusted under 35 U.S.C. 154(b) by 211 days.

(21) Appl. No.: 12/673,403

(22) PCT Filed: Jul. 30, 2008

(86) PCT No.: PCT/EP2008/006504
§ 371 (c)(1),
(2), (4) Date: Feb. 12, 2010

(87) PCT Pub. No.: WO2009/021672
PCT Pub. Date: Feb. 19, 2009

(65) Prior Publication Data
US 2011/0124277 A1      May 26, 2011

(30) Foreign Application Priority Data

Aug. 11, 2007 (DE) .......................... 10 2007 038 365

(51) Int. Cl.
*A22C 17/12* (2006.01)
(52) U.S. Cl. ...................................... 452/127
(58) Field of Classification Search .................. 452/125, 452/127, 149, 152, 153, 161, 162
See application file for complete search history.

(56) References Cited

U.S. PATENT DOCUMENTS

| 5,236,323 A | 8/1993 | Long et al. | |
| 5,558,573 A * | 9/1996 | Basile et al. | 452/127 |
| 5,810,652 A * | 9/1998 | Eide et al. | 452/125 |
| 6,120,369 A * | 9/2000 | Eide | 452/149 |
| 6,213,863 B1 | 4/2001 | Basile, II | |
| 6,264,542 B1 * | 7/2001 | Gasbarro | 452/125 |
| 7,090,573 B2 * | 8/2006 | Grosseholz et al. | 452/161 |
| 7,090,574 B2 * | 8/2006 | Braeger et al. | 452/162 |
| 7,244,174 B2 * | 7/2007 | Schill | 452/130 |
| RE40,085 E * | 2/2008 | Jurs et al. | 452/150 |
| 7,344,437 B2 * | 3/2008 | Van Den Nieuwelaar et al. | 452/187 |
| 7,637,805 B1 * | 12/2009 | Bueide | 452/179 |
| 2004/0248509 A1 | 12/2004 | Schill | |
| 2006/0035004 A1 | 2/2006 | Arnason | |

FOREIGN PATENT DOCUMENTS

DE    43 22 478 A1    1/1994

OTHER PUBLICATIONS

International Search Report for PCT/EP2008/006504 dated Nov. 19, 2008 with English Translation.
Written Opinion for PCT/EP2008/006504 w/ English translation.

* cited by examiner

*Primary Examiner* — Richard Price, Jr.
(74) *Attorney, Agent, or Firm* — Venable LLP; Robert Kinberg; Ryan M. Flandro

(57) ABSTRACT

An apparatus for skinning fish fillets includes a skinning knife to separate skin from the fish fillets, a delivery element to deliver the fish fillets into the region of the skinning knife, a driver roller for the skin separated from the fish fillets, a contact pressure element including a device to indicate a position of the contact pressure element, a discharge element to carry away the skinned fish fillets; and an element arranged in a region of the driver roller to monitor an input of fish fillets onto the driver roller and an output of fish fillets from the driver roller.

9 Claims, 1 Drawing Sheet

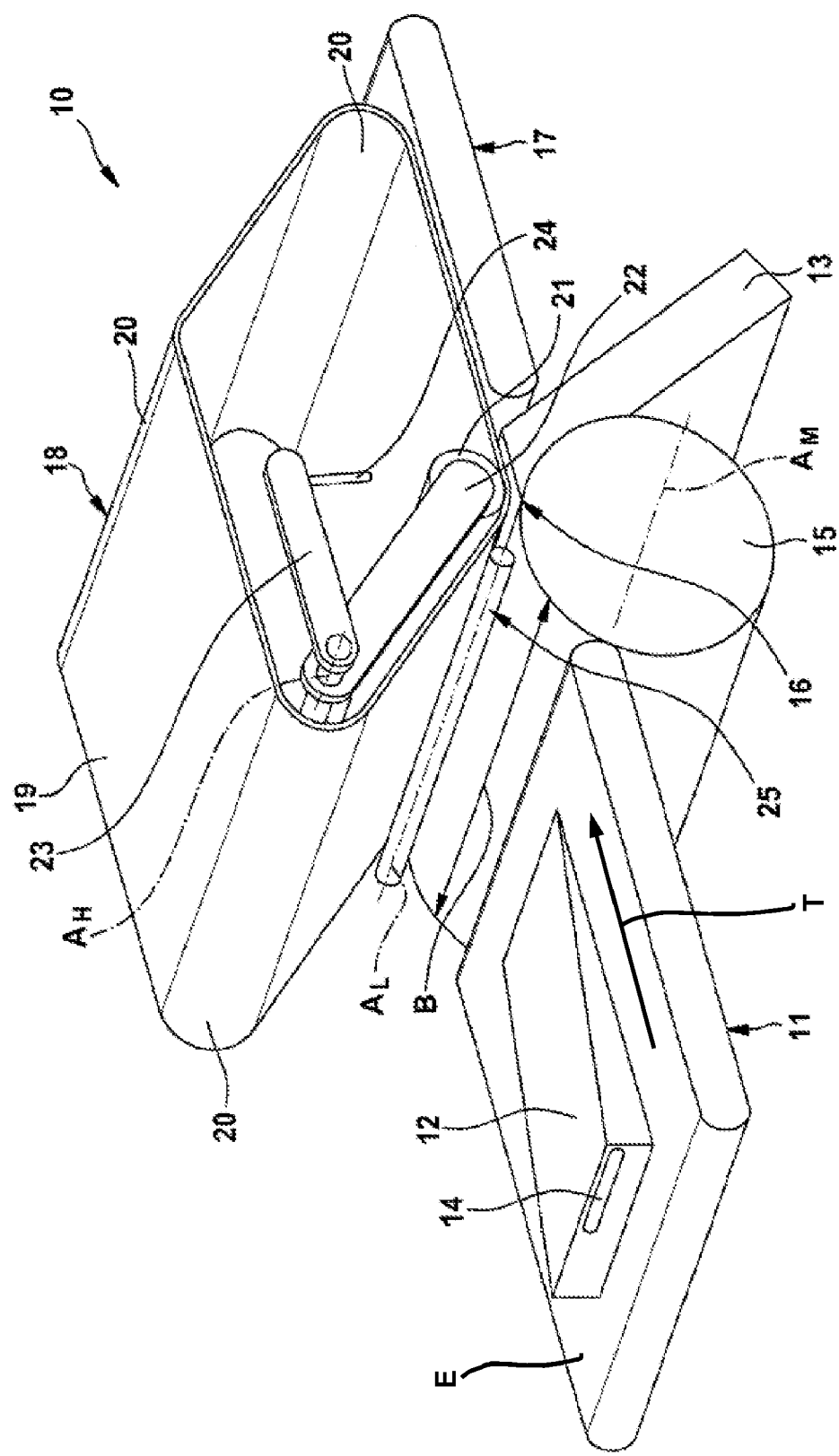

DEVICE AND METHOD FOR SKINNING FISH FILLETS

CROSS-REFERENCE TO RELATED APPLICATIONS

This application is a National Stage Application of PCT/EP2008/006504, filed Jul. 30, 2008, which designates the United States and claims the priority of German patent application DE 10 2007 038 365.9, filed on Aug. 11, 2007, the subject matter of which is incorporated herein by reference.

BACKGROUND OF THE INVENTION

The invention concerns an apparatus for skinning fish fillets, comprising a delivery element for delivering the fish fillets into the region of a skinning knife, the skinning knife for separating the skin from the fish fillet, a driver roller for the skin separated from the fish fillet, a contact pressure element having a means for controlling the position of the contact pressure element, and a discharge element for carrying away the skinned fish fillets. Furthermore, the invention concerns a method for skinning fish fillets, comprising the steps of: delivering a product stream composed of fish fillets on a delivery element, skinning the fish fillets by means of a skinning knife, deflection of a contact pressure element by the fish fillets during the skinning operation, a corresponding signal being triggered by deflection, and separately carrying away the skinned fish fillets on a discharge element on the one hand and the separated skin into a gap formed between a driver roller and the skinning knife on the other hand.

Apparatuses and methods of this kind are used in the fish-processing industry. Here, the fish fillets of different size or length are usually conveyed tail first on the delivery element into the region of the separating means. With the separating means the skin is separated from the fish fillet. During the separating operation the contact pressure element is deflected by the fish fillet body itself. Apart from the fact that the contact pressure element presses down the fish fillet and holds it down during the separating operation, the deflected contact pressure element also serves as a signal transmitter. As long as the contact pressure element is raised by the fish fillet, it is indicated that the skinning operation is not yet over. Only when the thicker head end of the fish fillet has completely left the separating means, does the contact pressure element drop back to its original position and so shows that the skinning operation is successfully completed. The apparatuses and methods can also be used to separate other surface layers, such as e.g. fat layers or the like, from fish or meat products, the direction of conveying the products being variable.

Apparatuses and methods as described above are known. However, with these apparatuses and methods there is the drawback that the fish fillets which are provided with bone or fin remains or other contaminants can catch on the skinning knife in practice. The result is then an accumulation of products at the skinning knife, which hinders processing, namely the skinning of subsequent fish fillets. This leads to faulty processing of the fish fillets, so that the skinned fish fillets are of only poor quality. There may also be a complete blockage in the region of the gap between driver roller and skinning knife, which leads to stopping of the product stream. The signal triggered by the contact pressure element is, however, not sufficient on its own to distinguish between a fault and a long fish fillet. To put it another way, the fact that the contact pressure element is deflected for longer than planned on the one hand could mean that there is a fault, and on the other hand could indicate that a particularly long product is being skinned. Accordingly a reliable statement cannot be made about the actual state of the product stream.

SUMMARY OF THE INVENTION

It is therefore the object of the present invention to provide a compact apparatus which ensures a uniform and continuous product stream. Furthermore, the object consists of proposing a corresponding method.

This object is achieved by an apparatus having the features mentioned hereinbefore by the fact that in the region of the driver roller is arranged an element for monitoring the input of fish fillets onto the driver roller and the output of fish fillets from the driver roller. As a result, it is possible in a surprisingly simple manner to control or regulate the product stream in cooperation with the existing signal triggered by the contact pressure element.

An appropriate development of the invention is distinguished by the fact that the element for monitoring the product stream composed of fish fillets is arranged in front of the contact pressure element in the direction of transport T of the fish fillets. Due to the distance between the element on the one hand and the contact pressure element on the other hand, a time window which simplifies control and/or regulation is defined during transport of the fish fillets.

Advantageously, the monitoring element is a light barrier. By this means particularly reliable and cost-efficient monitoring is ensured.

A preferred embodiment is characterised in that the light barrier is constructed and designed in such a way that the full width of the driver roller transverse to the direction of transport T is monitored. With this embodiment it is ensured that the input and output of products can be reliably monitored independently of their position on the delivery element and then on the driver roller.

The object is also achieved by a method having the steps mentioned hereinbefore by the fact that the input of the fish fillets onto the driver roller and the output of the fish fillets from the driver roller are monitored. The resulting advantages have already been described in connection with the apparatus, on account of which reference is made to the corresponding passages, to avoid repetition.

BRIEF DESCRIPTION OF THE DRAWINGS

Further appropriate or advantageous features and embodiments of the invention are apparent from the subsidiary claims and the description. A particularly preferred embodiment of the apparatus as well as the method are described in more detail with the aid of the attached drawing. The drawing shows:

FIG. 1 a perspective view of the apparatus according to the invention.

BRIEF DESCRIPTION OF THE EMBODIMENTS

The apparatus described in the single FIGURE serves to skin fish fillets. Naturally, the apparatus can also be used for separating other surface layers from fish fillets or from other products.

The apparatus 10 comprises a delivery element 11 for delivering separated fish fillets 12. The fish fillets 12 can be transported headfirst or tail first, as shown in FIG. 1, in the direction of transport T into the region of a skinning knife 13. The fish fillets 12 may be free from contaminants or provided with contaminants, for example bone remains 14, fin remains or the like. The skinning knife 13, which is of spring-loaded construction in the embodiment described, can be constructed differently and for example comprise a band knife and/or a stationary blade and/or other separating means. Behind the delivery element 11, which is preferably constructed as a belt or chain conveyor, in the direction of transport T is arranged a driver roller 15 for the skin separated from the fish fillet 12, which is designed to rotate about an axis $A_M$. The axis $A_M$ runs transversely to the direction of transport T. A drive (not shown) is provided for driving the driver roller 15.

Behind the driver roller 15 in the direction of transport T is arranged the skinning knife 13. The skinning knife 13 is arranged at a distance from the driver roller 15 to form a gap 16 for receiving the skin separated from the fish fillet 12. Adjoining the skinning knife 13 is a discharge element 17 for carrying away the skinned fish fillets 12, which is also designed as a belt or chain conveyor. The skin separated from the fish fillet 12 is carried away separately via the gap 16. Above the skinning knife 13 is arranged a contact pressure element 18. The contact pressure element 18 in the embodiment shown comprises a revolving belt 19 which is guided round several deflecting and/or driving elements 20.

Furthermore, the contact pressure element 18 comprises a roller 21 which is arranged on a pivotable lever arm 22. The lever arm 22 is pivotable about an axis $A_H$. Associated with the same axis $A_H$ is a switching lug 23 or the like. The switching lug 23 and the lever arm 22 are fixed relative to each other, so that a movement of the lever arm 22 is carried out accordingly by the switching lug 23. Associated with the switching lug 23 is a proximity switch 24. To put it another way, the proximity switch 24 is operatively connected to the switching lug 23, so that the proximity switch 24 can trigger a signal depending on the position of the switching lug 23. Generally speaking, the switching lug 23 and the proximity switch 24 form a means for indicating the position of the contact pressure element 18 or the roller 21.

In the region of the driver roller 15 is arranged an element 25 for monitoring the input of the fish fillets 12 onto the driver roller 15 and the output of the fish fillets 12 from the driver roller 15. The element 25, which is located above the driver roller 15 in the region of the plane of transport E, is arranged in front of the contact pressure element 18 and in particular in front of the roller 21 in the direction of transport T of the fish fillets 15. Preferably the element 25 is arranged in the region of the highest point of the driver roller 15 or, referred to the width of the driver roller 15, in the region of the highest line of the driver roller 15. Put simply, the element 25 serves to detect the beginning of each continuously conveyed fish fillet 12 as well as the end of each fish fillet 12, and may also be arranged in a different position to the one described.

Preferably, the element 25 is constructed as a light barrier. The light barrier is constructed and designed in such a way that the full width B of the driver roller 15 is monitored. For this purpose the light barrier extends transversely to the direction of transport T across the full width B of the driver roller 15. The centre axis $A_L$ of the light barrier or the light beams run parallel to the axis $A_M$ of the driver roller 15. In other embodiments, the transmitter and receiver of the light barrier may be offset and/or arranged at an angle to each other. The light barrier is shown only schematically in FIG. 1, because optionally other means may be used as well, e.g. mechanical sensors or the like, optical measuring elements such as e.g. a camera or the like, or combinations thereof. It is crucial that the means is constructed and designed in such a way that before triggering of a signal by the fish fillet 12 itself by means of the contact pressure element 18 or roller 21 additional information can be obtained for controlling the position of the fish fillets 12 before actual separation.

But the invention is not confined to the embodiment described. Thus the endlessly rotating delivery element 11 and the endlessly rotating discharge element 17 can also be constructed as trough conveyors or in another known manner. Also the contact pressure element 18 or the means for position control can be constructed differently with known elements. Instead of the roller 21, a pivotable flap or the like may be provided.

Below, the principle of the method is described in more detail with the aid of the single FIGURE. The fish fillets 12 are transported on the delivery element 11 in the direction of the rotating driver roller 15. Upon input of the fish fillets 12 onto the driver roller, the light barrier is interrupted. The fish fillets 12 move with the skin into the gap 16 between the driver roller 15 and the skinning knife 13. The fish fillet 12 from which the skin has been removed moves beyond the skinning knife 13 in the direction of the discharge element 17, and in the process lifts the roller 21 in the rotating belt 19. As soon as the roller 21 is lifted, the switching lug 23 also moves away from the proximity switch 24, triggering a signal.

In the normal process, the trailing end, preferably the thicker head end, of the fish fillets 12 passes the light barrier completely and releases it again. As a result, the information that the fish fillet 12 has come onto the driver roller 15 over its whole length and left it again is known. Depending on the speed of the apparatus 20 or, to be more precise, the delivery element 11, driver roller 15 and discharge element 17, the contact pressure element 18 or the roller 21 is lowered again after a given time t, so that the switching lug 23 energises the proximity switch 24 again. In other words, the skinning operation is completed and the skinned fish fillet 12 has left the region of the skinning knife 13 via the discharge element 17.

In the event that the fish fillet 12 has disruptive contaminants, such as e.g. bone remains 14, the fish fillet 12 to be skinned may catch on the skinning knife 13. The fish fillet 12 has in fact already released the light barrier again. However, the contact pressure element 18 or roller 21 cannot drop, so that the proximity switch 24 is not energised either. If therefore the roller 21 does not drop after a given time t, an action for eliminating the source of error is triggered automatically. Without the light barrier, such automation would not be possible, as for example particularly long fish fillets 12 could keep the light barrier interrupted, therefore there is no fault at all.

As soon as the light barrier is therefore released and the roller 21 does not drop again after a given time t, the roller e.g. can be pushed in front of the skinning knife 13 in the direction opposite the direction of transport T. Also the gap 16 between driver roller 15 and skinning knife 13 could be increased to release the jammed fish fillets 12 or parts of them again. There is also the possibility of carrying out additional cuts with the skinning knife 13 or additional blades or the like, in order to cut free the disruptive areas. A further option consists of raising the roller 21 for a short time in order to push the faulty or disruptive fish fillets 12 out of range of the skinning knife 13. Naturally, other options for remedying errors may be used as well.

However, other so-called faults may arise as well. For instance, in the event that the light barrier remains interrupted by a fish fillet 12 with corresponding disruptive contaminants, while the contact pressure element 18 or roller 21 has already dropped back into the starting position. Then too a fault which can be remedied by a corresponding action is indicated. The interruption of the light barrier may equally well be triggered by dirt or the like.

Another case in which both the light barrier is interrupted and the contact pressure element 18 or roller 21 cannot yet be lowered into the starting position again, is also indicated as a fault with the corresponding consequences.

Accordingly different errors and faults may be indicated, so that both previous and subsequent production steps can be controlled and/or regulated.

For control and/or regulation of the apparatus 10 on the one hand and for carrying out automatic elimination of errors on the other hand, a control system (not shown) is associated with the apparatus 10. Regardless of the reporting of an error and automatically remedying it, an optical and/or acoustic signal could also be generated, indicating to an operator that it is necessary to intervene in the apparatus 10. Furthermore, the signals and information obtained could also be used to reduce the speed of transport of the apparatus 10 or to stop the apparatus 10 completely, should remedying of the error not be completed within a predetermined time t.

The invention claimed is:

1. An apparatus for skinning fish fillets, comprising:
   a skinning knife to separate skin from the fish fillets;
   a delivery element to deliver the fish fillets into the region of the skinning knife;
   a driver roller for the skin separated from the fish fillets;
   a contact pressure element arranged to be deflected by a skinned fish fillet and including a device to indicate a position of the contact pressure element;
   a discharge element to carry away the skinned fish fillets; and
   an element arranged in a region of the driver roller to monitor an input of fish fillets onto the driver roller and an output of fish fillets from the driver roller.

2. The apparatus according to claim 1, wherein the element to monitor the fish fillets in the region of the driver roller is arranged in front of the contact pressure element in a direction of transport of the fish fillets.

3. The apparatus according to claim 1, wherein the monitoring element comprises a light barrier.

4. The apparatus according to claim 3, wherein the light barrier is operatively arranged so that a full width of the driver roller transverse to the direction of transport is monitored.

5. The apparatus according to claim 3 wherein the roller has a rotational axis and the light barrier is parallel to the rotational axis of the driver roller.

6. A method for skinning fish fillets, comprising:
   delivering a product stream composed of fish fillets on a delivery element,
   skinning the fish fillets with a skinning knife,
   deflecting a contact pressure element by the fish fillets during the skinning of the fish fillets;
   triggering a signal corresponding to a deflection of the contact pressure element;
   separately carrying away skinned fish fillets on a discharge element (17) on the one hand and separated skin into a gap formed between a driver roller and the skinning knife on the other hand; and
   monitoring an input of the fish fillets onto the driver roller and an output of the fish fillets from the driver roller.

7. The method according to claim 6, wherein the monitoring includes interrupting a light barrier upon passage of each fish fillet from the delivery element onto the driver roller and releasing the interruption when the fish fillet leaves the driver roller.

8. The method according to claim 6, wherein the monitoring includes monitoring the driver roller across a full width of the driver roller.

9. The method according to claim 6, and further including correlating with each other the signal triggered by deflection of the contact pressure element and information obtained from the monitoring step to control and/or regulate measures for eliminating faults in a flow of the fish fillets.

* * * * *